UNITED STATES PATENT OFFICE.

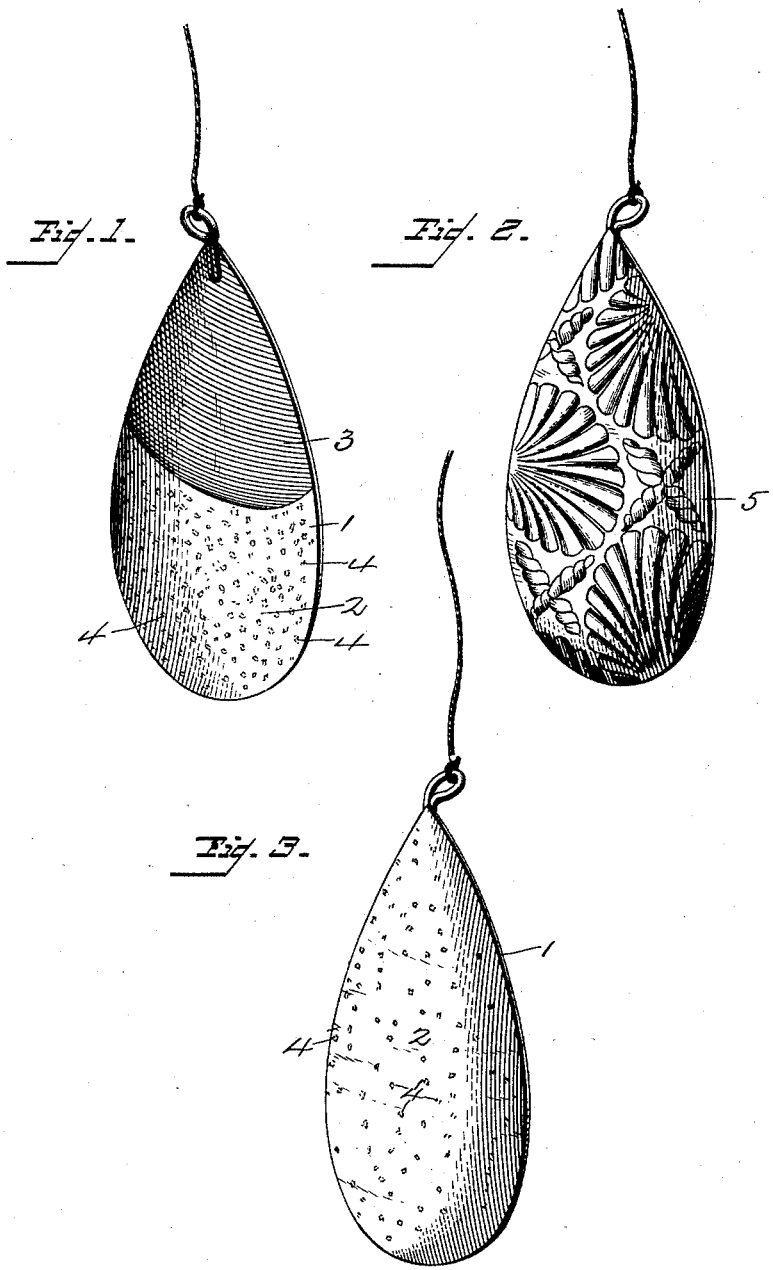

ERNEST F. PFLUEGER, OF AKRON, OHIO.

ARTIFICIAL FISH-BAIT.

SPECIFICATION forming part of Letters Patent No. 468,361, dated February 9, 1892.

Application filed November 14, 1890. Serial No. 371,436. (No model.)

*To all whom it may concern:*

Be it known that I, ERNEST F. PFLUEGER, a citizen of the United States, residing at Akron, in the county of Summit and State of Ohio, have invented certain new and useful Improvements in Artificial Fish-Baits; and I do hereby declare the following to be a full, clear, and exact description of the invention, such as will enable others skilled in the art to which it appertains to make and use the same.

My present invention relates to a new and useful improvement in artificial fish-baits, especially of that character where a gaudy and brilliant object is desired to attract the fish and secure the easy snaring thereof.

The object of the present invention is to produce a bait which will possess the maximum of attractiveness to fish.

The invention, briefly stated, consists in attaching to the bait independent flakes or particles of a bright iridescent substance or substances, whereby the brilliancy and attractiveness of the bait are greatly increased over such baits as are coated simply with bright or gaudy colored pigment or with luminous paint, such bright and attractive flakes or particles being applied either directly to the material of which the bait is constructed or to a coating thereon of paint or other suitable material, as will hereinafter appear.

In the accompanying drawings, Figure 1 represents a trolling-spoon constructed or treated according to my present invention and with the convex face of plain metal and the concave face coated with different-colored paint and having independent particles or flakes of bright substance thereon. Fig. 2 represents a trolling-spoon with its back or convex portion coated white with particles or flakes of some bright and attractive substance or substances scattered or strewn thereon. Fig. 3 represents a trolling-spoon having one face entirely coated with a white substance and with bright particles thereon.

While in the accompanying drawings I have represented my present improvement as applied to a trolling-spoon, it will be manifest from the following description that it is equally well adapted for application to artificial baits generally, and I desire to state at the outset that I do not limit myself to the application of my improvement to any particular form or character of artificial baits.

In my preferred mode of carrying my invention into effect I paint or otherwise apply to either the whole or a portion of the surface or surfaces, wall or walls of the bait, as 1, a coat of light or bright and attractive substance—such, for instance, as white or luminous or other bright-colored and attractive paint or other substance, as 2, or partly-white paint 2 and partly-other-colored paint 3. Upon such coated surface or surfaces, wall or walls, or upon the uncoated face of the material of which the bait is constructed, as may be preferred, or upon any portion of either of such surfaces, I then strew or sprinkle independent flakes or particles of some bright and attractive iridescent substance—such, for instance, as flakes of bright and vari colored metal, crushed pearl, or other bright substance 4. By this means the brightness and attractiveness of the bait is largely increased over baits having simply bright or parti colored painted faces or even when coated with a luminous compound.

The bait may be of any suitable or desired shape or design and material. Its faces may be partly uncoated, as at 5, and partly coated with a gaudy, brilliant, or attractive substance or substances, as at 3, and the independent bright flakes or particles applied to any portion thereof, or one face may be coated with some suitable light (as white) or bright colored pigment or other substance, and the other face provided or not, as desired, with particles or flakes of attractive material, as metal, crushed pearl, and the like, either with or without the previous application thereto of a foundation coating of pigment.

Artificial fish-baits with a luminous surface or surfaces are now very generally employed for the purpose of snaring fish, especially those kinds that feed at night, and while I have found that my bait of that character and patented to me on, respectively, February 13, 1883, No. 272,317, and on August 28, 1883, No. 284,056, has given great satisfaction to anglers I have also found that by applying to a bait such particles or flakes of bright substance or substances as herein mentioned, minus the luminous coating, such bait has been rendered quite attractive to fish, rendering their snaring easy of accomplishment, while when such bright flakes have been used in connection with the luminous coating the attractiveness of the bait has been largely increased, the iridescent particles producing the effect of fish-scales in appearance.

What I claim is—

1. An artificial fish-bait having a series of independent flakes or particles of iridescent or bright substance secured to the face thereof.

2. An artificial fish-bait having a series of independent flakes or particles of iridescent material, as metal, pearl, or analogous bright material attached thereto.

3. An artificial fish-bait having a brightened or colored face and a series of independent particles of iridescent material attached thereto.

In testimony whereof I affix my signature in presence of two witnesses.

ERNEST F. PFLUEGER.

Witnesses:
T. W. WAKEMAN,
GEORGE E. WARNER.